United States Patent [19]

Duncan

[11] Patent Number: 5,071,153
[45] Date of Patent: Dec. 10, 1991

[54] VEHICLE TOW BAR

[76] Inventor: Lee H. Duncan, 88806 Greenhill Rd., Eugene, Oreg. 97402

[21] Appl. No.: 428,791

[22] Filed: Oct. 30, 1989

[51] Int. Cl.⁵ .............................................. B60D 1/00
[52] U.S. Cl. .................................................. 280/491.4
[58] Field of Search ............... 280/491.4, 491.3, 491.2, 280/491.1, 478.1, 479.2, 482

[56] References Cited

U.S. PATENT DOCUMENTS

| | | | |
|---|---|---|---|
| 3,147,027 | 9/1964 | Bronleewe | 280/491.4 |
| 3,281,162 | 10/1966 | Carson | 280/491.3 |
| 4,572,538 | 2/1986 | Schofield et al. | 280/478.1 |
| 4,856,805 | 8/1989 | Davis | 280/491.4 |

*Primary Examiner*—Charles A. Marmor
*Assistant Examiner*—Alan M. Kagen
*Attorney, Agent, or Firm*—Olson & Olson

[57] ABSTRACT

A vehicle tow bar includes a transverse cross member which mounts one elongated leg assembly in fixed position at one end of the cross member and a second elongated leg assembly for movement along the cross member between a collapsed condition closely adjacent the first leg assembly and an erected, operative position at the opposite end of the cross member. Stub shafts reinforce the ends of the cross member at the points of maximum stress. The ends of the leg assemblies opposite the cross member are connected to an apex frame which detachably mounts a socket coupler component of a ball and socket trailer hitch. Each leg assembly includes telescopic sections for adjusting the length of the leg assembly, and a locking pin mechanism releasably interconnects the telescopic sections. A limit pin removably connects the telescopic sections of the one elongated leg assembly and functions when interconnecting the telescopic sections to prevent the sections from separating beyond the position of the locking pin, and functions when removed from the leg assembly to allow separation of the telescopic sections beyond the position of the locking pin, to allow collapsing of the leg assemblies to storage position. A stop pin on each assembly prevents the telescopic sections from disconnecting.

4 Claims, 4 Drawing Sheets

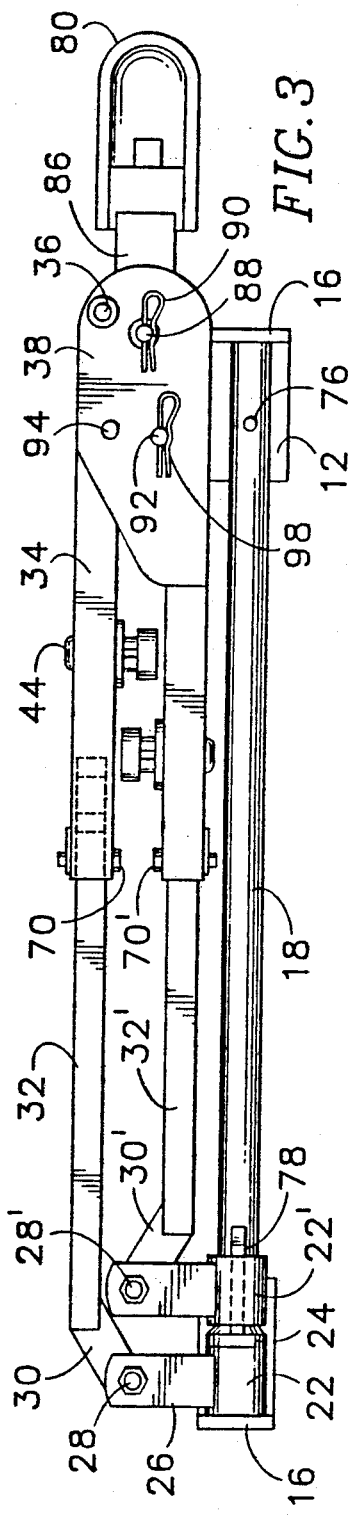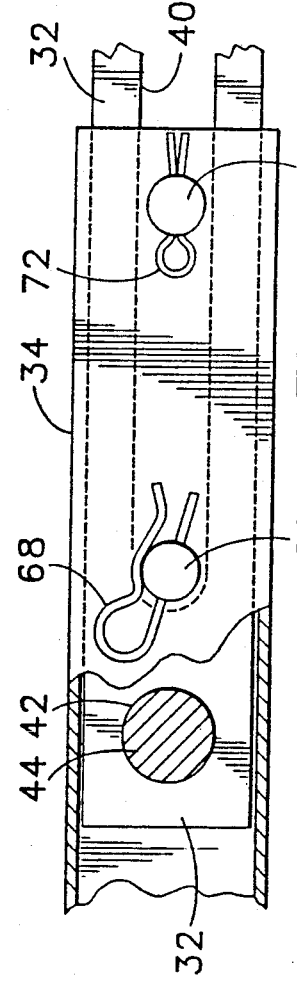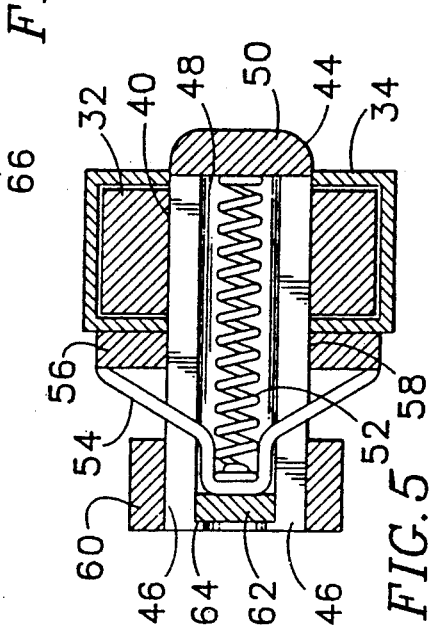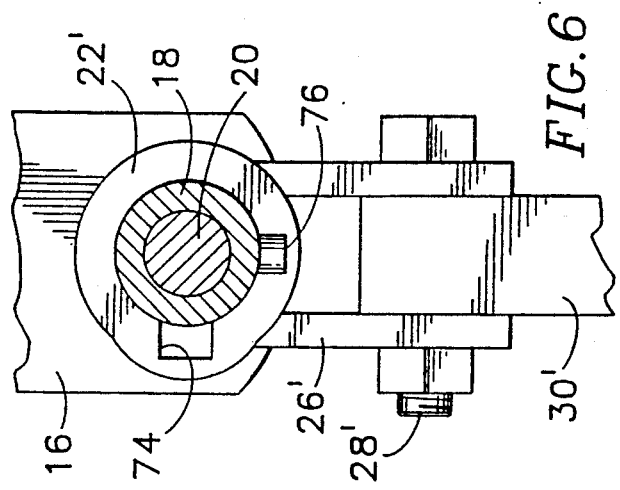

VEHICLE TOW BAR

BACKGROUND OF THE INVENTION

This invention relates to vehicle tow bars, and more particularly to collapsible tow bars arranged for permanent or long term attachment to a vehicle which is to be towed periodically, as is common with RV enthusiasts.

Specifically, the present invention is an improved construction over my earlier vehicle tow bar disclosed in U.S. Pat. No. 4,577,883.

Tow bars are known in the art and, until my earlier invention, they comprised ridged "A" frame tongue members connected pivotally to the front frame of a vehicle and movable between an operative, horizontally extending position for connection to a towing vehicle and an inoperative, storage position in which the "A" frame tongue member is pivoted and locked into a vertically extending position in which the frame and coupler projects upwardly above the hood of a car.

My earlier invention was a vehicle tow bar that comprised a longitudinally extending tubular cross bar mounted laterally across the front of a vehicle to be towed, the cross bar mounting a longitudinally extensible, telescoping reach having a trailer hitch coupler on the front end thereof, the reach mounted on the cross bar for lockable sliding movement thereon, pivotal rotation thereon and lateral pivotal movement relative thereto. A pair of chains connected to the forward position of the reach extend to opposite longitudinal ends of the cross bar and are arranged to become taut when the reach is telescoped to its maximum length. During hook up, the reach is permitted to pivot side-to-side, up and down and telescope forward and back so that hook up is greatly facilitated and does not require careful positioning of the cars relative to each other in order to connect the hitch components. When connected together, the reach is tensioned and locked into fully elongated condition, thereby tensioning the chains, and retaining the reach in direct, forwardly extending position prevented from lateral pivoting.

Functionally, my earlier tow bar has demonstrated ongoing superior performance. However, my earlier construction requires the provision of a heavy and particularly strengthened cross bar to support the forces exerted on it by the reach which extends forwardly from the unsupported center of the cross bar during towing. The particularly heavy cross bar and the chains result in considerable weight being added to the front end of a car, which is not necessarily desirable to the user. Also, since the chains are exposed to the elements during towing, and must be manually stored and retried from the chain tray before and after uses, there is the tendency for the accumulated dirt on the chains to transfer to the user's hands and clothing which poses an incidental inconvenience.

SUMMARY OF THE INVENTION

In its basic concept, this invention provides a pivotal, collapsible vehicle tow bar which comprises an "A" frame tongue member pivotally mounting a trailer hitch coupler at its point, the opposite ends of the legs being mounted for pivotal movement about a tubular cross member mounted on reinforcing end stub shafts to extend laterally across the front end of a vehicle to be towed, one of the "A" frame legs mounted for sliding movement along the length of the cross bar and the other leg fixed adjacent one longitudinal end of the cross bar, both legs comprising longitudinally extensible, two section telescoping members that are releasably lockable when the legs are extended to a desired maximum length in which the trailer hitch coupler is positioned centrally between and forwardly of the pivotal mount of the legs on the cross bar.

It is by virtue of the forgoing basic concept that the principal objective of this invention is achieved; namely, the provision of an "A" frame type vehicle tow bar which is collapsible into a very compact storage condition and is pivotally moveable throughout a wide range of positions which permit connection of the coupler to trailer hitch on a tow vehicle that accordingly does not need to be accurately aligned with the vehicle to be towed in order to accomplish connection, and distributes the forces of towing to the cross bar adjacent its end portions, thereby eliminating the requirement, and the resulting expense and weight, of a reinforced cross bar and the towing chains of my earlier tow bar.

Another object and advantage of this invention is the provision of a vehicle tow bar of the class described which utilizes a releasable telescoping leg locking mechanism that eliminates the occurrence of binding when engaged to secure the leg sections in extended condition and provides a quick and positive locking engagement when the leg sections are telescoped into their locking position.

Another object and advantage of this invention is the provision of a vehicle tow bar of the class described which is significantly lighter in overall weight and is more convenient in operation than collapsible vehicle tow bars heretofore available in the art have been.

Another object and advantage of this invention is the provision of a vehicle tow bar of the class described which is collapsible into a very compact storage condition, making it particularly convenient for use on small cars.

A further object and advantage of this invention is the provision of a vehicle tow bar of the class described which may utilize, if desired, a detachable hitch coupler that can be removed when the tow bar is in storage condition so that the coupler does not protrude laterally beyond the side of small cars.

A still further object and advantage of this invention is the provision of a vehicle tow bar of the class described which is of simplified construction for economical manufacture and reliability of use.

The foregoing and other objects and advantages of this invention will appear from the following detailed description, taken in connection with the accompanying drawings of a preferred embodiment.

BRIEF DESCRIPTION OF THE DRAWINGS

FIG. 3 is a front elevation of the tow bar of FIG. 1 in fully collapsed, storage position.

FIG. 4 is a fragmentary side elevation, on an enlarged scale, as viewed in the direction of the arrows 4—4 in FIG. 1, a portion being broken away to disclose internal structural details.

FIG. 5 is a sectional view, on an enlarged scale, taken on either of the lines 5—5 in FIG. 1.

FIG. 6 is a fragmentary sectional view, on an enlarged scale, taken on the line 6—6 in FIG. 9.

DESCRIPTION OF THE PREFERRED EMBODIMENT

Figure 9:
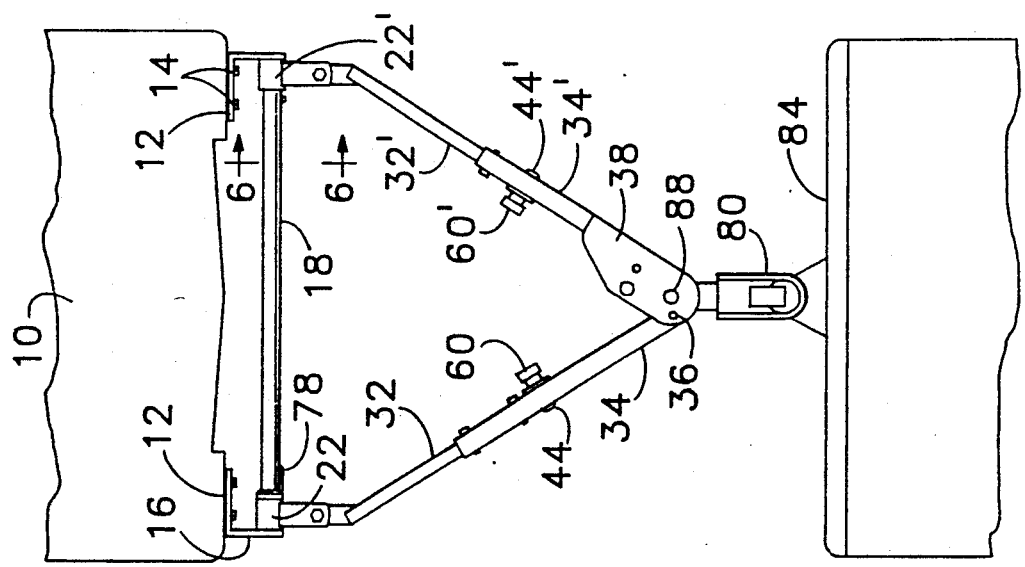
FIGS. 7, 8 and 9 are fragmentary plan views illustrating consecutive steps involved in connecting the tow bar of the preceding views to a towing vehicle that is misaligned laterally from the vehicle to be towed.
Figure 8:
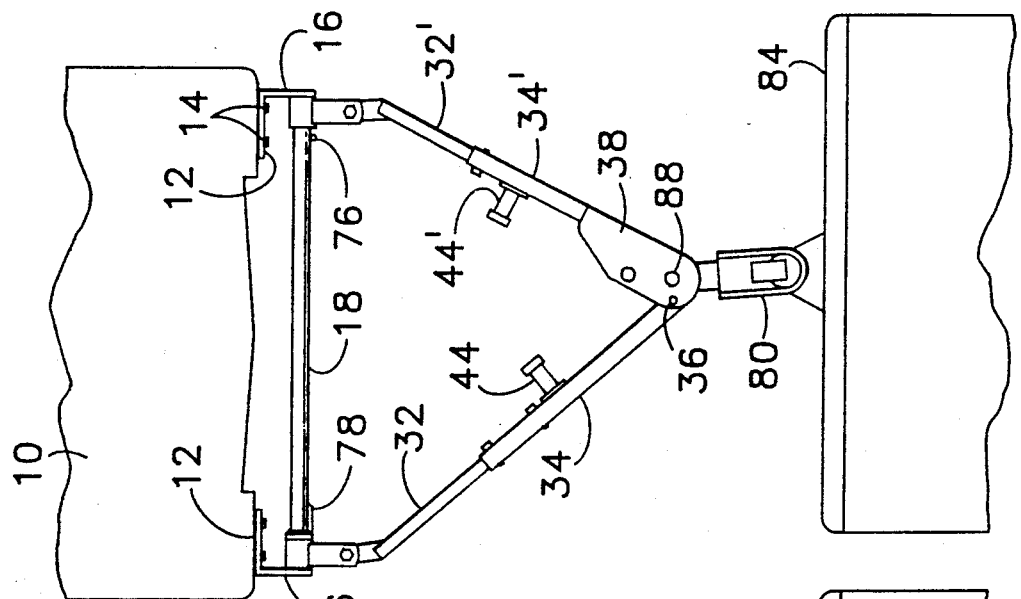
Figure 7:
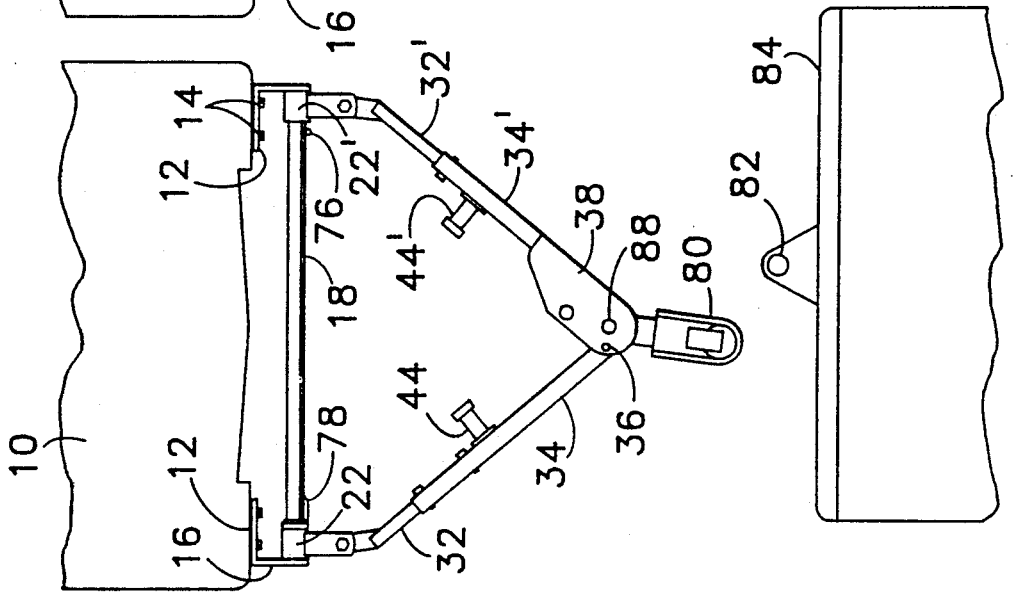

For purposes merely of illustration, the tow bar of this invention is shown in FIGS. 7, 8 and 9 to be mounted on a frame member of a vehicle 10 to be towed, as by means of a pair of laterally spaced angle brackets. One leg 12 of each bracket is secured to the vehicle frame member, permanently as by welding or removably as by the bolts 14 illustrated.

The other leg 16 of each angle bracket extends longitudinally forward of the vehicle 10 and secures between them a transverse cross member 18. As illustrated, the cross member is a hollow tube and is secured at its ends to reinforcing stub shafts 20 welded or otherwise attached non-rotatably to the angle brackets.

Mounted rotatably on one end of the cross member 18 is a sleeve 22. The sleeve is retained against axial movement along the cross member by confinement between the angle bracket leg 16 and a collar 24 secured to the cross member. A bracket 26 is secured to and extends radially outward from the sleeve.

Secured pivotally to the outer end of the bracket 26 by pivot pin 28 is an angularly offset end portion 30 of an elongated bar 32. The opposite end of the bar is received slidably within one end of an elongated hollow box beam 34. The opposite end of the box beam 34 is secured pivotally by pivot pin 36 to an apex frame 38.

The bar 32 and box beam 34 are slidable one relative to the other, in telescopic manner, and thus form an elongated leg of adjustable length. Adjustment of length is provided by a locking pin 44 arranged for retractable reception in aligned openings in the bar and box beam.

In the embodiment illustrate (FIGS. 4 and 5), the bar 32 is provided with an elongated slot 40 intermediate its ends. The inner, solid end portion of the bar is provided with a transverse locking opening 42 for the retractable reception of locking pin 44. The locking pin also extends through aligned openings in opposite sides of the box beam 34.

Mean is provided for preventing disconnection of the locking pin 44 from the box beam. As illustrated, the pin is provided with a longitudinally extending diametric slot 46 which traverses an axial bore 48. The slot and bore are terminated inwardly of one end of the pin by a cap 50 which serves as an abutment for one end of an elongated coil spring 52 contained within the bore 48. The opposite end of the coil spring abuts a wire bail 54 which extends freely through the diametric slot 46. The bail is secured at its opposite ends to a plate 56 secured to the box beam. An opening 58 through the plate serves to guide the locking pin 44 in its retractable movement.

The end of the locking pin opposite the cap 50 is provided with an enlarged head 60 for grasping by the fingers in order to retract the locking pin from the bar 32. Upon release of the head 60, the coil spring 52 urges the locking pin inwardly through the opening in the bar. The inward movement of the locking pin is terminated when the bail 54 abuts a plug 62 confined within the bore 48 against an annular shoulder 64 defined by a counterbore section of the bore 48.

A limit pin 66 extends removably through aligned openings in the box beam 34 and through the slot 40 in the bar 32. This limit pin serves to restrict outward extraction of the bar from the box beam to the extent that the locking pin 44 would be located inwardly of the bar 32. This limitation of extraction of the bar avoids the inconvenience of having to manually extract the locking pin when it is desired to have the locking pin enter the locking opening.

However, it will be explained hereinafter that at one stage in the manipulation of the tow bar it is desired that the bar 32 be extracted to a position outwardly of the locking pin 44. This is accommodated by removing the limit pin 66, and this is facilitated by providing the limit pin with an easily removable cotter 68 extended through an opening in the limit pin.

On the other hand, it is also desired that complete separation of the bar 32 and box beam 34 be prevented. This is achieved by provision of a stop pin 70 which extends through aligned openings in the box beam adjacent the inner end thereof, and through the slot 40 in the bar. A conventional, substantially permanent cotter pin 72 extends through an opening in the stop pin to retain it in operative position.

A second, longitudinally adjustable elongated leg is provided by a similar assembly of components described hereinbefore. Accordingly, these components are identified by the same reference numerals which are distinguished by a superscript.

The second leg differs from the first described leg in the following respects: The sleeve 22' is not secured against axial movement along the cross member 18. Instead, such movement is by providing the sleeve 22' with an internal axially extending keyway 74. This keyway is located in such manner that when the first and second elongated legs are disposed in the vertical plane illustrated in FIGS. 1, 2 and 3, the keyway is aligned with a confinement pin 76 secured to the cross member 18. In this position of alignment, the sleeve 22' may be moved to the left in FIG. 1-3. When the sleeve 22' reaches the leftwardmost position of FIG. 3, the keyway 74 has received the latch key 78 which is secured to the cross member 18. The key prevents rotation of the first and second leg assemblies about the axis of the cross member in the fully collapsed position of FIG. 3.

Another deference resides in the rigid attachment of the box beam 34' to the apex frame 38, rather than the pivotal attachment of box beam 34 by pivot pin 36.

A further difference is the omission of a limit pin corresponding to limit pin 66.

The apex frame 38 serves to support a trailer hitch component. In the embodiment illustrated, the apex frame mounted the socket coupler component 80 of a conventional ball and socket trailer hitch. The ball component 82 is mounted on a frame member at the rear end of a towing vehicle 84 (FIG. 7), as will be understood.

In the preferred embodiment illustrated, the socket coupler component 80 is arranged for removable attachment to the apex frame 38. Thus, the reach 86 of the coupler component is provided with a pivot opening intermediate its ends for the removable reception of a pivot pin 88 which extends removably through aligned openings in the top and bottom plates of the apex frame. A removable type cotter 90 is employed to secure the pivot pin 88.

The outer end portion of the reach 86 is provided with an anchor opening for the removable reception of an anchor pin 92. This pin preferably is arranged to extend selectively through one or the other of two pairs of aligned anchor openings 94 and 96, respectively, in the apex plate. The pair of openings 94 is used to secure the coupler component 80 in the operative, towing position of FIG. 1 and 7-9. In this position the coupler component extends from the apex frame on the longitudinal centerline of the tow bar (and towed vehicle 10). The other pair of openings 96 is used to secure the coupler component in a storage position. A removable type cotter 98 is employed to secure the anchor pin 92 in either position of use.

As illustrated in FIG. 3, the coupler component 80 may be secured against free movement in the collapsed, storage position of the tow bar by the anchor pin 92. The coupler may be allowed free movement by removing the anchor pin. It is preferred, however, that the coupler component be removed from the apex frame 38 for separate storage, for example in the trunk of the towed vehicle. Removal of the coupler component is particularly advantageous when the tow bar is carried by a small automobile, since the coupler component may project beyond the lateral side of the automobile.

FIG. 3 shows the tow bar fully collapsed across the front of the vehicle to be towed. To bring the tow bar to operative position, the apex frame is grasped in the hands and raised upward, pivoting the assembly counterclockwise about the axes of the pivot pins 28 and 28'. When the assembly is oriented substantially vertically above the cross member 18, the elongated second leg of bar 32' and box beam 34' is moved toward the right, away from the first leg, by sliding the sleeve 22' along the cross member 18. This is accompanied by shortening of the first leg bar 32 and box beam 34. To allow this shortening to continue as the second leg assembly is moved toward the right, the locking pin 44 must be retracted to allow the bar 32 to pass inward. When the sleeve 22' has moved past the pin 76, by the latter registering with the keyway 74, the leg assembly is pivoted forwardly and downwardly in front of the vehicle 10 to a substantially horizontal position. The tow bar now is ready for coupling to a towing vehicle 84.

Referring now to FIGS. 7, 8 and 9, these illustrate the mode of operation of the tow bar when the towing and towed vehicles are misaligned laterally relative to their central longitudinal axis. Thus, the locking pins 44 and 44' are retracted to allow the leg bars 32 and 32' and box beams 34 and 34' to extend telescopically so as to move the socket coupler component 80 into registry with the ball component 82 on the towing vehicle 84 (FIG. 8). When the ball and socket components are securely coupled, the towing vehicle 84 is driven forward, or the towed vehicle 10 driven rearward, until the locking pins 44 and 44' enter the locking openings 42 and 42', respectively. In this condition the elongated legs are secured rigidly against further extension or retraction, and the tow bar thus is in operative, towing condition.

Figure 1:
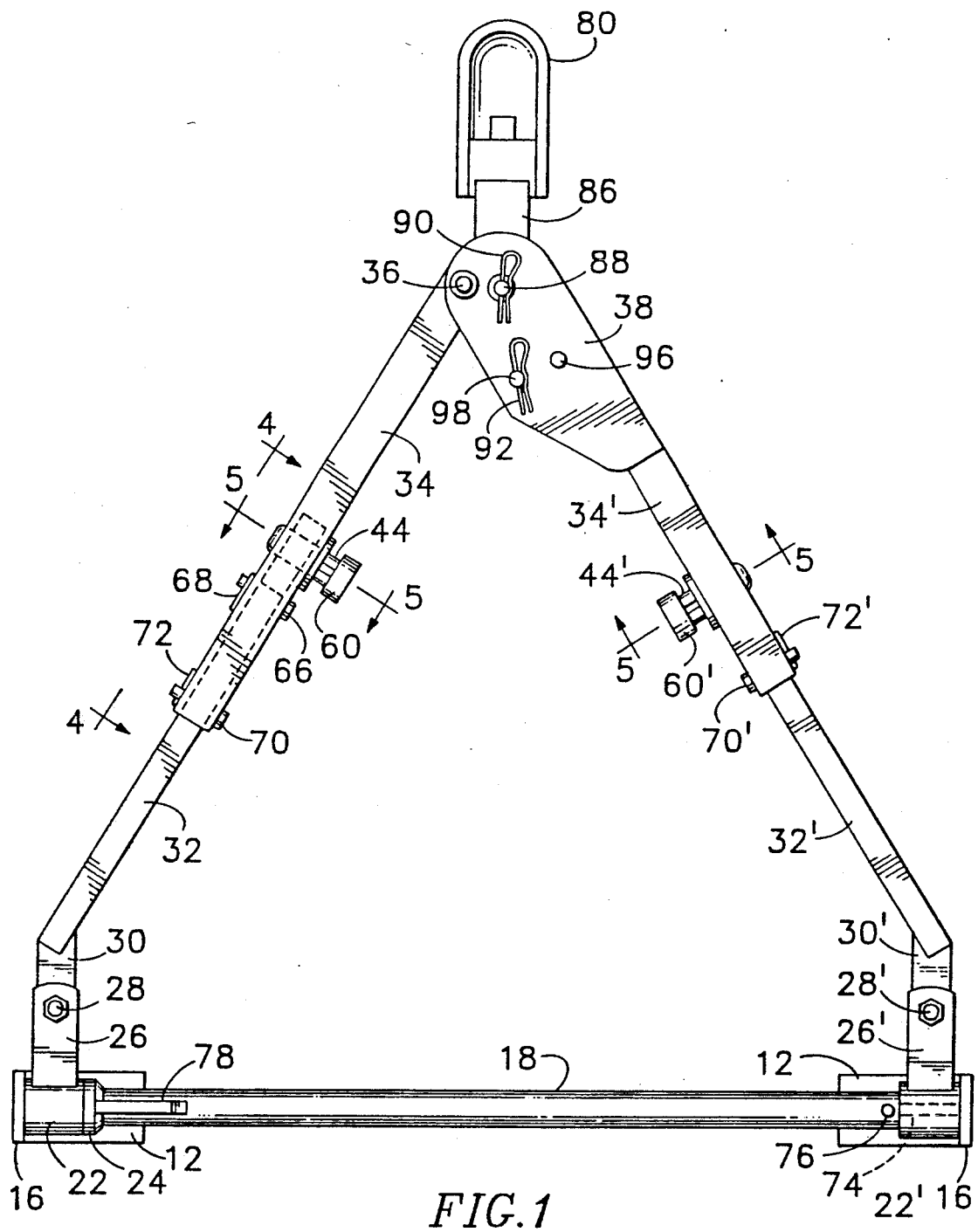
FIG. 1 is a front elevation of a tow bar embodying the features of this invention, the tow bar being shown in the locked position swung upwardly from horizontal, operative position to vertical position in preparation of collapsing to storage position.

When it is desired to collapse the tow bar for storage, the socket component 80 is disconnected from the ball component 82, and the leg assembly is swung upwardly about the cross member 18 in front of the towed vehicle to the vertical position of FIG. 1. The limit pin 66 is removed, by removing the cotter 68, and the locking pin 44 is retracted from locking opening 42. The leg bar 32 and box beam 34 thus are released for extension.

Figure 2:
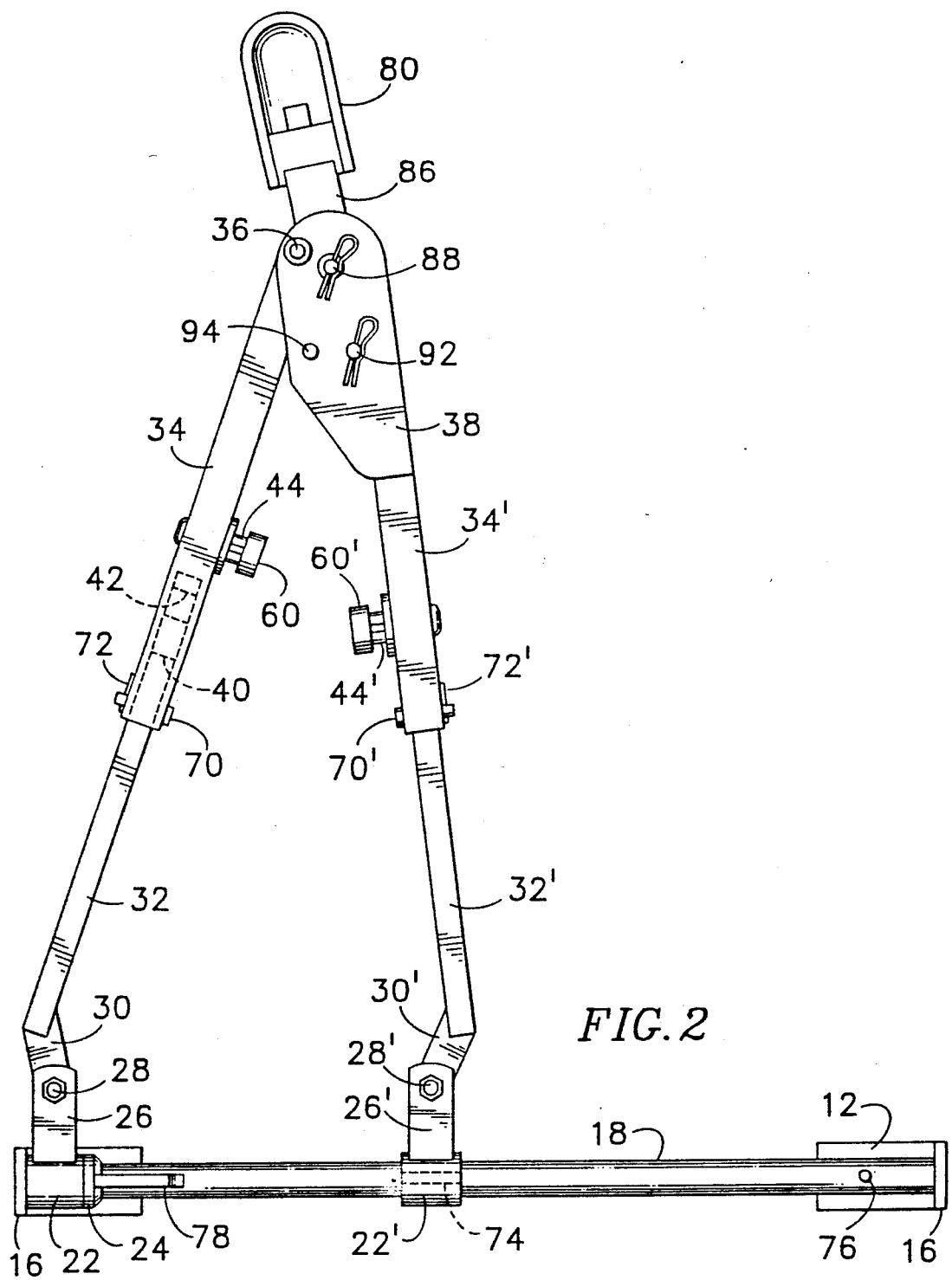
FIG. 2 is a front elevation of the tow bar of FIG. 1 in an intermediate position of collapsing to storage position.

The second leg bar 32' and box beam 34' are retained in locked condition by locking pin 44', and the leg assembly is moved toward the left, as in FIG. 2, by sliding the sleeve 22' along the cross member 18. This movement is accommodated by alignment of keyway 74 and pin 76.

As the second leg assembly moves leftward toward the first leg assembly, the latter assembly elongates to allow the second leg assembly to move close to it. The pair of closely coupled leg assemblies then are pivoted laterally downward, clockwise about the axes of the pivot pins 28 and 28', to the fully folded and collapsed condition shown in FIG. 3. In this position the latch key 78 has entered the keyway 74, whereby the leg assembly is secured against rotation about the axis of the cross member 18.

If desired, the collapsed leg assemblies may be secured further by securing a strap or rope around the leg assemblies and cross member. In addition, the socket component 80 may be disconnected from the apex frame 38 to reduce the lateral length of the stored assembly.

Referring to FIG. 3, it is to be noted that the arrangement of equal length brackets 26 and 26' and offset bar portions 30 and 30' enables the leg assemblies to be collapsed to minimum height, whereby to present an attractive appearance at the front of a vehicle upon which it is mounted. Since the leg assemblies are positioned at the ends of the cross member in the operative, towing position, the cross member may be of minimum cross section and weight, since the forces of the towing operation are applied to the ends of the cross member and stub shafts at the frame-mounted angle brackets.

It will be apparent to those skilled in the art that various modifications and changes may be made in the size, shape, type, number and arrangement of parts described hereinbefore without departing from the spirit of this invention and the scope of the appended claims.

I claim:

1. A vehicle tow bar, comprising
   a) an elongated cross member having a longitudinal axis and configured to be attached to and extend transversely across the front end of a vehicle to be towed,
   b) first and second elongated leg members each having first and second telescopic sections,
   c) first sleeve means mounted on a first end of the cross member for rotation about the longitudinal axis of said cross member,
   d) second sleeve means mounted on the second end of the cross member for rotation about the longitudinal axis of said cross member,
   e) first and second pivot means connecting the first telescopic sections of the first and second leg members to the first and second sleeve means for pivoting said leg members on an axis perpendicular to the axis of said sleeve means,
   f) apex frame means secured to the second telescopic section of the second leg member,
   g) pivot means interconnecting the apex frame means and the second telescopic section of the first leg member,
   h) first and second locking means releasably interengaging the first and second telescopic sections of the first and second leg members for releasably securing said sections against longitudinal displacement, each locking means comprising 1) a locking pin having a longitudinal axis and configured for removal reception in registering opening in the first telescopic sections of a leg member,
2) the locking pin having a longitudinal bore and diametric slot,
3) cap means closing one end of the longitudinal bore,
4) an enlarged head on the end of the locking pin opposite said cap means,
5) a ball member extending through the diametric slot and secured at its opposite ends to the outer one of said first and second telescopic sections of the member,
6) a coil spring in the longitudinal bore abutting the cap means at one end and the bail member the opposite end, and
7) plug means secured in the end of the longitudinal bore opposite the cap means for abutment by the bail member in the locking position of the locking pin,
i) first confinement means on the cross member for restraining the first sleeve means from axial movement along the cross member,
j) second confinement means on the cross member for restraining the second sleeve means from axial movement along the cross member when the second sleeve means is in said operative towing position,
k) confinement disengaging means on the second sleeve for releasing the second sleeve means for axial movement along the cross member when the second sleeve means is in said storage position,
l) latch means on the cross member adjacent the first sleeve means configured to engage the confinement disengaging means on the second sleeve means in said storage position for preventing axial rotation of the second sleeve means about the longitudinal axis of the cross member,
m) first trailer hitch coupling means configured for releasable connection to a companion second trailer hitch coupling means on a towing vehicle, and
n) connector means interconnecting the first trailer hitch coupling means and the apex frame.

2. The vehicle tow bar claim 1 including limit means releasably interengaging the first and second telescopic sections of the first leg member for releasably limiting longitudinal extension of said first leg member when the first locking means is in release position.

3. The vehicle tow bar claim 1 wherein the connector means releasably interconnects the first trailer hitch coupling means and the apex frame means for removing the coupling means from the apex frame means for separate storage.

4. A vehicle tow bar, comprising
a) an elongated cross member having a longitudinal axis,
b) a pair of mounting brackets configured to be attached to laterally spaced positions at the front end of a vehicle to be towed,
c) a stub shaft secured to each mounting bracket and extending toward each other and securing the opposite ends of the elongated cross member,
d) first and second elongated leg members each having first and second telescopic sections,
e) means mounting the first telescopic sections of the first and second leg members on the cross member for rotation about the axis of the cross member and for axial movement of one of the leg members toward and away from the second leg member,
f) apex frame means connecting the second telescopic sections of the first and second leg members together,
g) first trailer hitch coupling means configured for releasable connection to a companion second trailer hitch coupling means on a towing vehicle,
h) connector means interconnecting the first trailer hitch coupling means and the apex frame, and
i) first and second locking means releasably interengaging the first and second telescopic sections of the first and second leg members, respectively, for releasably securing said sections against longitudinal displacement, each locking means comprising
1) a locking pin having a longitudinal axis and configured for removal reception in registering openings in the first and second telescopic sections of a leg member,
2) the locking pin having a longitudinal bore and a diametric slot,
3) cap means closing one end of the longitudinal bore,
4) an enlarged head on the end of the locking pin opposite said cap means,
5) a bail member extending through the diametric slot and secured at its opposite ends to the outer one of said first and second telescopic sections of the leg member,
6) a coil spring in the longitudinal bore abutting the cap means at one end and the bail member at the opposite end, and
7) plug means secured in the end of the longitudinal bore opposite the cap means for abutment by the bail member in the locking position of the locking pin.

* * * * *

UNITED STATES PATENT AND TRADEMARK OFFICE
CERTIFICATE OF CORRECTION

PATENT NO. : 5,071,153
DATED : 10 December 1991
INVENTOR(S) : LEE H. DUNCAN It is certified that error appears in the above-identified patent and that said Letters Patent is hereby corrected as shown below:

```
Column 1, line 30, "position" should read --portion--.

"     1,   "  52, "retried"    "      " --retrieved--.

"     3,   "  50, "Mean"       "      " --Means--.

"     4,   "  36, after "is" insert: --accommodated--.

"     7,   "  11, "ball" should read --bail--.
```

Signed and Sealed this

Twenty-fifth Day of May, 1993

Attest:

MICHAEL K. KIRK

*Attesting Officer*   Acting Commissioner of Patents and Trademarks